US012255375B2

(12) United States Patent
Liu et al.

(10) Patent No.: US 12,255,375 B2
(45) Date of Patent: Mar. 18, 2025

(54) AU AND RU HAVING CWG FILTERS, AND BS HAVING THE AU OR RU

(71) Applicant: Telefonaktiebolaget LM Ericsson (publ), Stockholm (SE)

(72) Inventors: Yongbin Liu, Beijing (CN); Juandi Song, Beijing (CN); Yuhua Xiao, Beijing (CN); Ying Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 215 days.

(21) Appl. No.: 17/907,800

(22) PCT Filed: Mar. 29, 2021

(86) PCT No.: PCT/CN2021/083665
§ 371 (c)(1),
(2) Date: Aug. 29, 2022

(87) PCT Pub. No.: WO2021/197277
PCT Pub. Date: Oct. 7, 2021

(65) Prior Publication Data
US 2023/0147406 A1 May 11, 2023

(30) Foreign Application Priority Data
Mar. 30, 2020 (WO) ................ PCT/CN2020/082065

(51) Int. Cl.
*H01P 1/213* (2006.01)
*H01P 1/20* (2006.01)
*H01P 1/208* (2006.01)
*H01P 5/107* (2006.01)

(52) U.S. Cl.
CPC .......... *H01P 1/2136* (2013.01); *H01P 1/2002* (2013.01); *H01P 1/2088* (2013.01); *H01P 5/107* (2013.01)

(58) Field of Classification Search
CPC .. H01P 1/2002; H01P 5/20; H01P 3/16; H01P 1/2138; H01P 1/213; H01P 3/00; H01P 1/2088; H01P 5/107
USPC ................. 333/208–212, 236, 239, 245, 248
See application file for complete search history.

(56) References Cited

U.S. PATENT DOCUMENTS 5,023,866 A 6/1991 De Muro
2002/0053954 A1 5/2002 Shamsaifar et al.
2003/0090344 A1 5/2003 Wang et al.
2015/0295294 A1* 10/2015 Rogozine ............. H01P 1/2138 333/135
2020/0411935 A1* 12/2020 Jing ...................... H01P 1/2088
(Continued)

FOREIGN PATENT DOCUMENTS

CN 109672011 A 4/2019
CN 209691912 U 11/2019
EP 0506340 A3 9/1993
(Continued)

*Primary Examiner* — Rakesh B Patel
(74) *Attorney, Agent, or Firm* — Murphy, Bilak & Homiller, PLLC

(57) ABSTRACT

An antenna unit, a radio unit, and a base station are disclosed. The antenna unit or the radio unit includes a plurality of filters, each having a respective radio frequency passband. At least one first filter is a CWG filter. The first filter is coupled to a second filter through a T-junction formed on an antenna board or a radio mother board.

16 Claims, 7 Drawing Sheets

(56) References Cited

U.S. PATENT DOCUMENTS

| | | | | |
|---|---|---|---|---|
| 2021/0127489 | A1* | 4/2021 | Adhikari | H04W 88/08 |
| 2022/0359966 | A1* | 11/2022 | Jian | H01P 3/08 |

FOREIGN PATENT DOCUMENTS

| | | | |
|---|---|---|---|
| EP | 0575174 | A1 | 12/1993 |
| EP | 0711001 | A2 | 5/1996 |
| EP | 1753071 | A1 | 2/2007 |
| EP | 2503858 | A1 | 9/2012 |
| EP | 2982005 | A1 | 2/2016 |

* cited by examiner

AU AND RU HAVING CWG FILTERS, AND BS HAVING THE AU OR RU

TECHNICAL FIELD

The present disclosure generally relates to components of communication device, and more particularly, to an antenna unit (AU) or a radio unit (RU) having ceramic waveguide (CWG) filters, and a base station (BS) having the AU and/or the RU.

BACKGROUND

This section introduces aspects that may facilitate better understanding of the present disclosure. Accordingly, the statements of this section are to be read in this light and are not to be understood as admissions about what is in the prior art or what is not in the prior art.

BS is an important part of mobile communication system, and may include an RU and an AU. Considering the installation/fixation/occupation, smaller volume and lighter weight is always an important evolution direction in BS design, including legacy base station, street macro, micro, small cell and advanced antenna system (AAS).

With the development of 5th Generation (5G) communication, Multiple-Input and Multiple-Output (MIMO) technology is widely used in Sub-6 GHz BS product, in which a large amount of filters need to be integrated/embedded with AU or RU. Considering cost and space saving, filters are usually soldered onto radio mother board (MOB), low pass filter (LPF) board, antenna calibration (AC) board or antenna power splitter board, which means smaller and lighter filters are quite in demand.

In traditional BS solution, metal cavity filter is most recommended because of its high quality factor (Q) value and power handling performance. For 5G advanced radio system, power handling requirement becomes less critical, while the size and weight of filters becomes hot issues. CWG filter is one of most preferred 5G filter solutions, due to its competitive Q value, light weight, small size and low cost.

In time divisional duplex (TDD) multi-band systems and frequency division duplex (FDD) systems, to find a proper duplexer or multiplexer to reduce radio size, weight and cost is also important. CWG duplexer or multiplexer is a good solution for this. CWG duplexer or multiplexer has more benefits especially for the better design flexibility.

CWG duplexer and multiplexer also can be used in some traditional macro BS instead of metal cavity multiplexer. It has great advantages in respect of weight and size compared with metal cavity multiplexer. It has better insertion loss and power handing capacity than other kinds of filter. There is no doubt that CWG duplexer and multiplexer will be a new popular solution in BS system, it will be more and more widely used with the better development of ceramic manufacturing technology. To find a proper way to design and produce CWG filters with different bands or different channels is a key factor about CWG duplexer and multiplexer.

RU and AU integrated with filters is a main direction in 5G AAS TDD system. To find a better way to integrate duplexer with RU and AU is also a key factor in TDD system, which will reduce the radio size, volume and cost.

Traditional multiplexer is made by metal cavity, which has high weight, volume and high cost. Metal multiplexer has longer production cycles and not good for radio miniaturization. CWG multiplexer is a viable alternative backup solution to solve such problems.

However, it is difficult to connect more than two CWG band pass filter (BPF) together due to design and production limitation. It is difficult to build large size ceramic with more than two BPFs in the production process. The soldering quality and ceramic reliability couldn't be guaranteed if size is large, so there is no ceramic duplexer and multiplexer used in mass production until now.

Existing CWG multiplexer normally uses a ceramic T-junction to divide one signal to different paths. This kind of T-junction will increase the size and weight of the ceramic part and will also increase design difficulty. Different multiplexer paths can't be located at flexible positions, and more crosstalk may occur between different multiplexer paths.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved CWG duplexer or multiplexer used in AU, FU or BS, which can reduce the size, weight, volume of the products, get better design flexibility, and make the production of duplexer and multiplexer become easier.

According to a first aspect of the disclosure, there is provided an AU. The AU comprises an antenna board and a plurality of filters each having a respective radio frequency passband. At least one first filter is a CWG filter. The first filter is coupled to a second filter through a T-junction formed on the antenna board or another board mounted together with antenna array.

In an embodiment of the disclosure, the T-junction is a microstip line or a strip line.

In an embodiment of the disclosure, the T-junction is connected with the first filter and/or the second filter via a soldering pad or a connector.

In an embodiment of the disclosure, the first filter has a plurality of resonators, and capacitive cross coupling between two of the resonators is achieved by a coupling structure on/in the antenna board or the another board, on which the T-junction is formed.

In an embodiment of the disclosure, the second filter is a CWG filter, a metal cavity filter, a surface acoustic wave (SAW) filter, a bulk acoustic wave (BAW) filter, or a film bulk acoustic resonator (FBAR) filter.

In an embodiment of the disclosure, the first filter and the second filter are arranged on the same side or different sides of the antenna board or the another board, on which the T-junction is formed.

In an embodiment of the disclosure, a low pass filter (LPF) is mounted on the antenna board or the another board, on which the T-junction is formed.

In an embodiment of the disclosure, the another board is an antenna calibration board or a power divider board.

According to a second aspect of the disclosure, there is provided an RU. The RU comprises a radio MOB and a plurality of filters each having a respective radio frequency passband. At least one first filter is a CWG filter. The first filter is coupled to a second filter through a T-junction formed on the radio MOB.

In an embodiment of the disclosure, the T-junction is a microstip line or a strip line.

In an embodiment of the disclosure, the T-junction is connected with the first filter and/or the second filter via a soldering pad or a connector.

In an embodiment of the disclosure, the first filter has a plurality of resonators, and capacitive cross coupling between two of the resonators is achieved by a coupling structure on/in the radio MOB.

In an embodiment of the disclosure, the second filter is a CWG filter, a metal cavity filter, an SAW filter, a BAW filter, or an FBAR filter.

In an embodiment of the disclosure, the first filter and the second filter are arranged on the same side or different sides of the radio MOB.

In an embodiment of the disclosure, an LPF is mounted on the radio MOB.

According to a third aspect of the disclosure, there is provided a BS. The BS comprises an AU according to the first aspect and/or a RU according to the second aspect.

In an embodiment of the disclosure, the BS is an FDD system or a dual band system.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
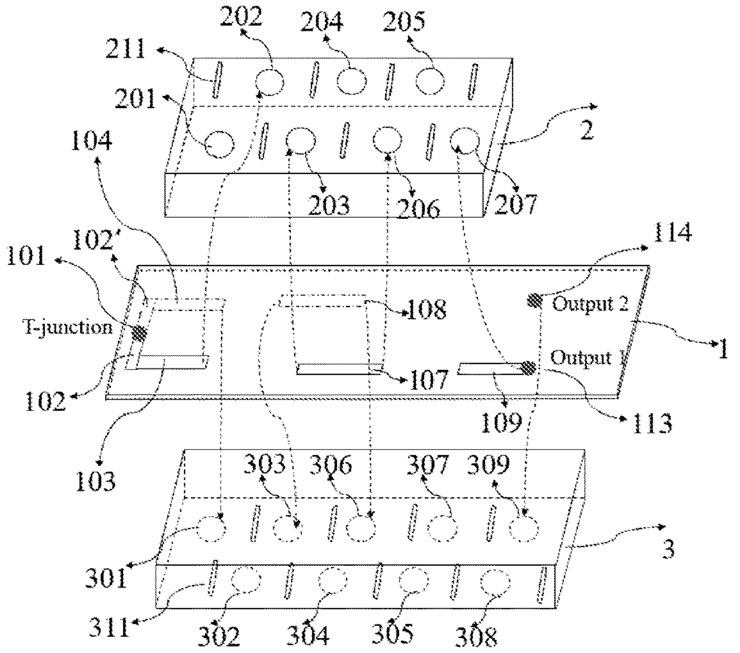
FIG. 1 is an exploded view illustrating a duplexer according to an embodiment of the disclosure.
Figure 2A:
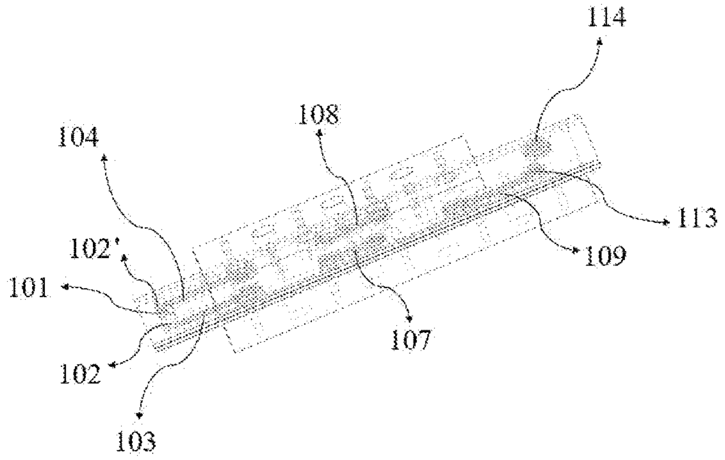
FIG. 2A, FIG. 2B and FIG. 2C show a perspective view, a top view and a bottom view, respectively, of the duplexer in an assembled state.
Figure 2B:
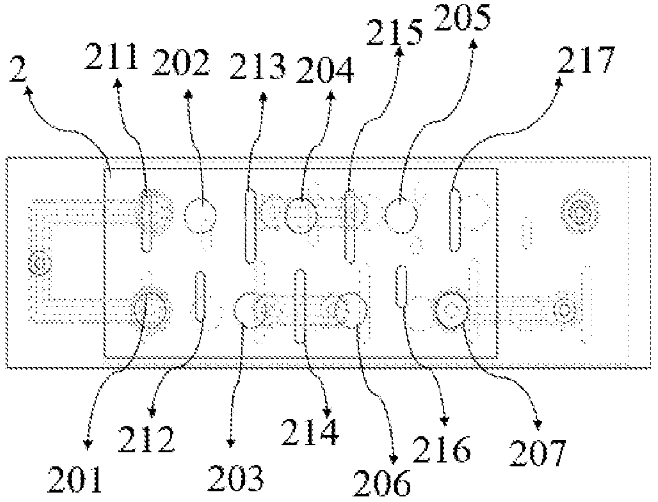
Figure 2C:
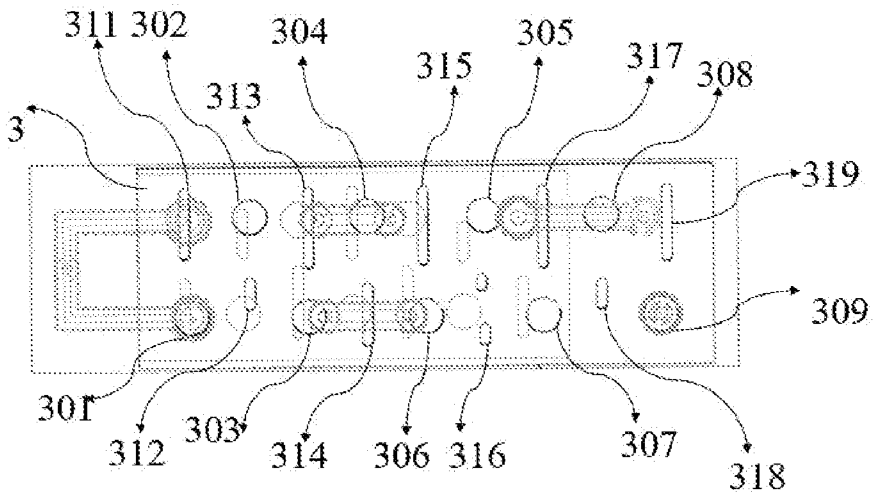

FIG. 1 is an exploded view illustrating a duplexer according to an embodiment of the disclosure. FIG. 2A, FIG. 2B and FIG. 2C show a perspective view, a top view and a bottom view, respectively, of the duplexer in an assembled state. As shown in FIG. 1, the duplexer according to this embodiment includes a printed circuit board (PCB) 1, a first filter 2, and a second filter 3. The first filter 2 and the second filter 3 are soldered onto opposite sides of the PCB 1 by soldering pads, and are common-grounded. In FIG. 1, the first filter 2 is arranged at the top side of the PCB 1, and the second filter 3 is arranged at the bottom side of the PCB 1.

Both the first filter 2 and the second filter 3 are CWG filters. Each CWG filter comprises a body made of a ceramic material. The surfaces of the body are covered with a conducting layer. The conducting layer may be a metalized layer that is formed by, for example, electroplating metal on the surfaces of the body. The metal may be silver, or may be another metal that satisfies a specific requirement.

The first filter 2 comprises seven resonators or resonating cavities, each having a respective blind hole 201, 202, 203, 204, 205, 206, 207. Although the blind holes 201-207 are shown to have a circular cross section, the present disclosure is not limited to this. For example, any of the blind holes 201-207 may be in a shape of a rectangle, an ellipse, or any other shapes in the cross section. Each of the blind holes 201-207 is provided with a conducting layer which, for example, is formed by electroplating metal on the bottom surface and the wall surface of the blind hole. The resonating frequency of each resonator may be tuned, for example, by removing a part of the conducting layer that covers the bottom surface and/or the wall surface of the respective blind hole.

In the illustrated embodiment, the seven blind holes 201-207 are all disposed on the top surface of the first filter 2. In other words, each of the blind holes 201-207 opens at the top surface of the first filter 2 and extends toward the bottom surface of the first filter 2. In another embodiment, some of the blind holes 201-207 may open at the bottom surface of the first filter 2 and extend toward the top surface of the first filter 2. The seven blind holes 201-207 may have same or different depth, i.e. dimension in the extending direction of the blind hole. The depth of each blind hole can be set as needed to obtain a desired resonance frequency.

Further, the first filter 2 has seven groove means 211-217 (see FIG. 2B) that penetrates through the body of the first filter 2. The groove means 211-217 serve as isolation walls between two adjacent resonators, which help to tune the coupling value between the two adjacent resonators. In the illustrated embodiment, each of the groove means 211-217 has a bar-shape in the cross section of the first filter 2. However, the present disclosure is not limited to this, and each of the groove means 211-217 may take any appropriate shape in the cross section.

The second filter 3 comprises nine resonators or resonating cavities, each having a respective blind hole 301, 302, 303, 304, 305, 306, 307, 308, 309. Further, the second filter 3 has nine groove means 311-319 (see FIG. 2C) serving as isolation walls between two adjacent resonators, which help to tune the coupling value between the two adjacent resonators. For details of the blinds holes 301-309 and the groove means 311-319, reference may be made to the blind holes 201-207 and the groove means 211-217 of the first filter 2. For example, although the nine blind holes 301-309 are all disposed on the bottom surface of the second filter 3 in the illustrated embodiment, the present disclosure is not limited to this, and some of the blind holes 301-309 may open at the top surface of the second filter 3 and extend toward the bottom surface of the second filter 3.

Figure 3:
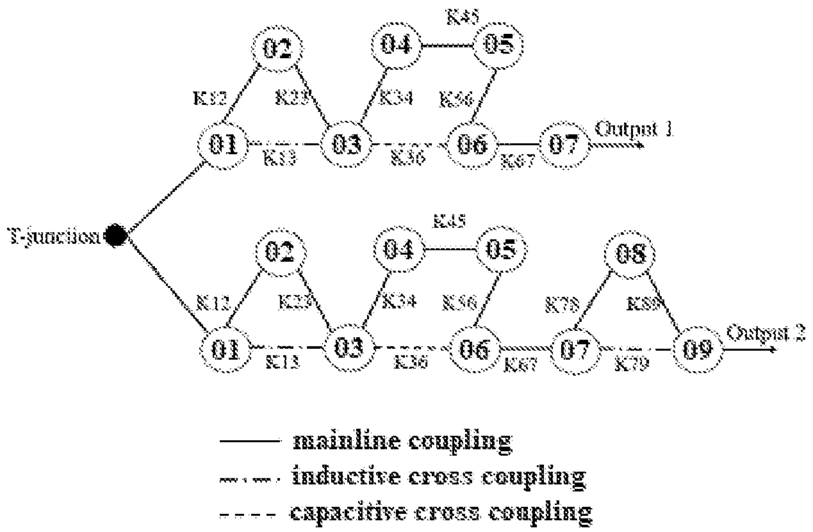
FIG. 3 is a schematic diagram illustrating a topology of the duplexer.

FIG. 3 is a schematic diagram illustrating a topology of the duplexer according to this embodiment. Two channels branch from a T-junction, which will be described later. In a first channel at the upper portion of FIG. 3, sequence numbers 01-07 in a circle correspond to the seven resonators of the first filter 2, respectively. In a second channel at the lower portion of FIG. 3, sequence numbers 01-09 in a circle correspond to the nine resonators of the second filter 3, respectively.

As shown in FIG. 3, in the first channel, or in other words, in the first filter 2, a 7-pole topology with three zeros is provided. Six mainline couplings K12, K23, K34, K45, K56, K67 are provided by a respective electrically conductive structure in the first filter 2, the type of which may be an aperture and/or a hole. One inductive/positive cross-coupling K13 is provided by a conductive aperture. One capacitive/negative cross-coupling K36 of low coupling value is provided by a transmission line or a coupler on the PCB 1, as will be described hereinafter.

Further, in the second channel, or in other words, in the second filter 3, a 9-pole topology with four zeros is provided. Eight mainline couplings K12, K23, K34, K45, K56, K67, K78, K89 are provided by a respective electrically conductive structure in the second filter 3, the type of which may be an aperture and/or a hole. Two inductive/positive cross-couplings K13, K79 are provided by conductive apertures. One capacitive/negative cross-coupling K36 of low coupling value is provided by a transmission line or a coupler on the PCB 1, as will be described hereinafter.

Figure 4:
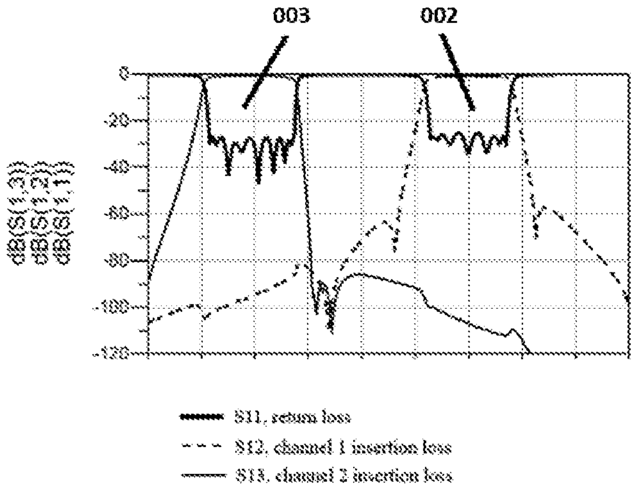
FIG. 4 is a schematic diagram illustrating a frequency response curve of the duplexer.

FIG. 4 is a schematic diagram illustrating a frequency response curve of the duplexer according to this embodiment. As shown in FIG. 4, the first filter 2 has a passband indicated by 002. Two zeros (only one is shown in FIG. 4) are produced on the high side of the passband 002, and one zero is produced on the low side of the passband 002. The second filter 3 has a passband indicated by 003. One zero (not shown in FIG. 4) are produced on the low side of the passband 003, and three zeros are produced on the high side of the passband 003. The frequency point position of each zero can be tuned by adjusting the corresponding cross-coupling value.

Now turning back to FIG. 1, the PCB 1 is provided with a T-junction. The T-junction is preferably designed as a microstrip line or a strip line on the PCB 1. The T-junction has an input port 101, two connection lines 102, 102' connected with the input port 101, and two signal divided stubs 103, 104 connected with the two connection lines 102, 102', respectively. The input port 101 may be a PCB pad, or a connector based on specific design requirement. The signal divided stub 103 is connected to the first filter 2, and more specifically, to the first resonator thereof which has the blind hole 201. The signal divided stub 104 is connected to the second filter 3, and more specifically, to the first resonator thereof which has the blind hole 301. For example, each of the signal divided stubs 103, 104 is connected to the corresponding one of the first filter 2 and the second filter 3 by a connector or by two soldering pads, one pad from the PCB 1 and the other from the first filter 2 or the second filter 3. In FIG. 1, the signal divided stub 104 and the connection line 102' are shown in dash-dot-lines, because they are arranged on the bottom side of the PCB 1 and thus are not visible from the top side of the PCB 1.

Figure 5:
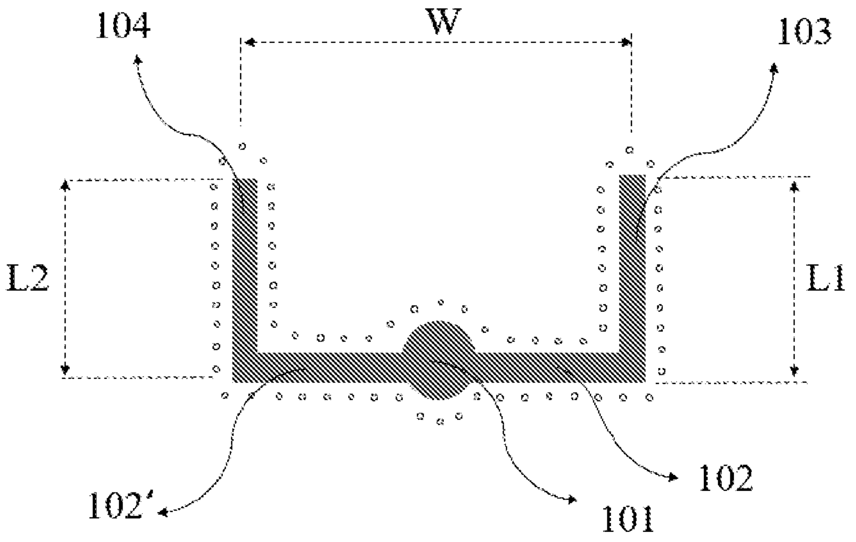
FIG. 5 is a schematic diagram illustrating a T-junction of the duplexer.

FIG. 5 is a schematic diagram illustrating a T-junction of the duplexer. As shown in FIG. 5, two signal divided stubs 103, 104 are branched from the input port 101 via the respective connection line 102, 102'. The width and the length of the connection lines 102, 102' can be changed according to performance. The signal divided stub 103 has a length L1. The signal divided stub 104 has a length L2, which may be the same as the length L1 or different from the length L1, depending on the layout of the first filter 2 and the second filter 3 on the PCB 1. Similarly, the two signal divided stubs 103, 104 may have same or different width. The distance W between the two signal divided stubs 103, 104 is approximately equal to the distance between the two resonators of the first and second filters 2, 3 that are coupled to each other by the T-junction.

Turning back to FIG. 1, the PCB 1 is further provided with two coupling structures 107, 108, an output transmission line 109, and two output connectors 113, 114. By means of the coupling structure 107, the capacitive cross-coupling K36 of the first filter 2 is achieved between a resonator having the blind hole 203 and another resonator having the blind hole 206. By means of the coupling structure 108, the capacitive cross-coupling K36 of the second filter 3 is achieved between a resonator having the blind hole 303 and another resonator having the blind hole 306. The coupling structures 107 and 108 may be embodied in various configurations, such as a transmission line, a parallel coupler, an interdigital coupler, or a broadside strip line coupler, the configurations of which are well-known to those skilled in the art. The output transmission line 109 connects the first output connector 113 for the first filter 2 with the last resonator of the first filter 2 that has the blind hole 207. On the other hand, the second output connector 114 for the second filter 3 is connected with the last resonator of the second filter 3 that has the blind hole 309 via an output pad provided on the ceramic part, and no output transmission line is needed.

The PCB 1 has four layers. The first layer is a covering layer on the top side of the PCB 1. The fourth layer is a covering layer on the bottom side of the PCB 1. The connection line 102, the signal divided stub 103, the coupling structure 107 and the output transmission line 109 are arranged at the second layer of the PCB 1. The connection line 102', the signal divided stub 104 and the coupling structure 108 are arranged at the third layer of the PCB 1.

In the above-mentioned embodiments, the first filter 2 is arranged at the top side of the PCB 1, and the second filter 3 is arranged at the bottom side of the PCB 1. In another embodiment, the first filter 2 and the second filter 3 may be located at the same side of the PCB 1. In a case where the first filter 2 and the second filter 3 are located at the same side of the PCB 1, the connection line 102 and the connection line 102' may be formed as a single common line.

In the above-mentioned embodiments, the first filter 2 has seven resonators or seven poles, and the second filter 3 has nine resonators or nine poles. It will be readily appreciated by those skilled in the art that there is no limitation to the number of the resonators or poles of each filter. Moreover, the first filter 2 and the second filter 3 in other embodiments of the present disclosure may have a topology different from that shown in FIG. 3. Further, any of the resonators of the first filter 2 and the second filter 3 may include two or more blind holes.

In the above-mentioned embodiments, both the first filter 2 and the second filter 3 are CWG filters. However, one of the first filter 2 and the second filter 3 may be a different kind of filter, such as a metal cavity filter, an SAW filter, a BAW filter, an FBAR filter, etc.

Figure 6:
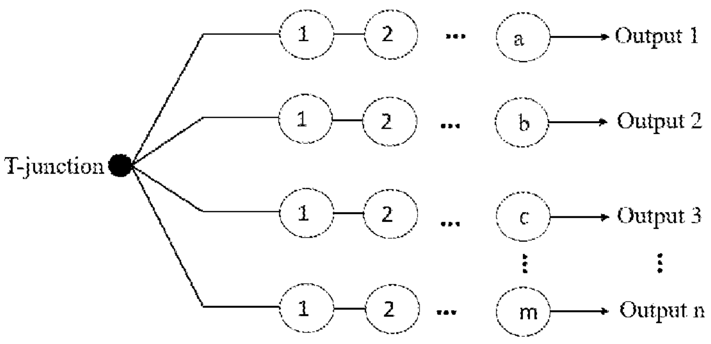
FIG. 6 is a schematic diagram illustrating a topology of a multiplexer according to an embodiment of the disclosure.

FIG. 6 is a schematic diagram illustrating a topology of a multiplexer according to an embodiment. As shown in FIG. 6, the multiplexer has n (n=3, 4, . . . , 8) channels, each of which may comprise a CWG filter having various numbers (a, b, c, . . . , m≠0) of resonators. The number of channels of the multiplexer can be arbitrary in theory, and the location of different channels can be arbitrary depending on actual requirement. Each channel has a corresponding output. The CWG filters from different channels are coupled to each other by a common T-junction, such as a strip line or a microstrip line on a PCB. One of the channels may have a different kind of filter from CWG filter. In addition, the disclosure may be applied to a dual band system or a multi-band system having a plurality of channels with a similar topology.

Figure 7:
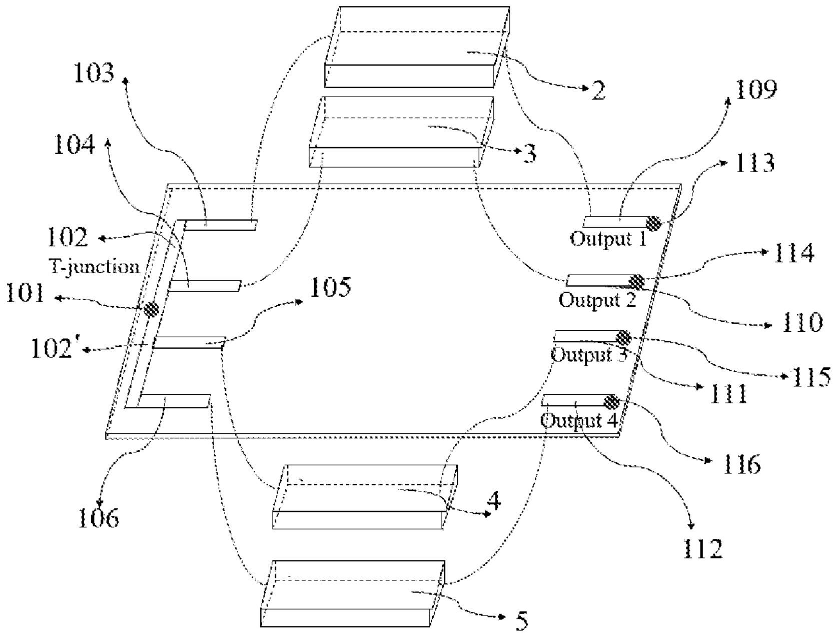
FIG. 7 is an exploded view illustrating a multiplexer according to an embodiment of the disclosure.

FIG. 7 is an exploded view illustrating a multiplexer according to an embodiment of the disclosure. As shown in FIG. 7, the multiplexer according to this embodiment comprises a PCB 1 and four filters 2, 3, 4, 5 at the top side of the PCB 1. At least one of the four filters 2-5 is a CWG filter. The PCB 1 is provided with a T-junction for coupling the four filters 2-5. The T-junction of the multiplexer is preferably designed as a type of connector, and has an input port 101, two connection lines 102, 102' connected with the input port 101, and four signal divided stubs 103, 104, 105, 106 connected with the two connection lines 102, 102', respectively. The input port 101 may be a PCB pad, or a connector based on detail design requirement. The two connection lines 102, 102' may be formed as a single common line. The signal divided stub 103 is connected to the first filter 2, the signal divided stub 104 is connected to the second filter 3, the signal divided stub 105 is connected to the third filter 4, and the signal divided stub 106 is connected to the fourth filter 5. Each of the signal divided stubs 103-106 may be connected to the corresponding one of the four filters 2-5 by two soldering pads, one pad from the PCB 1 and the other from the corresponding filter. Four output transmission lines 109, 110, 111, 112 are provided on the PCB 1 to connect the respective one of the four filters with a corresponding output connector 113, 114, 115 or 116. The length of each of the four output transmission lines 109-112 can be set according to actual requirement.

Figure 8:
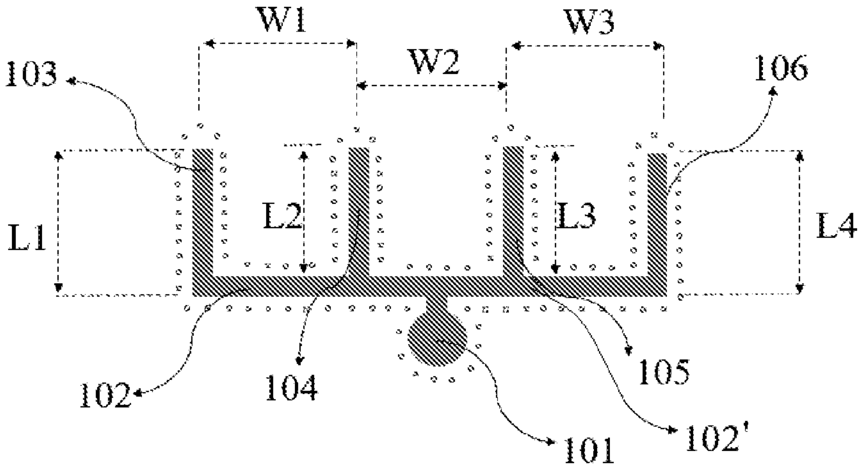
FIG. 8 is a schematic diagram illustrating the T-junction of the multiplexer.

FIG. 8 is a schematic diagram illustrating the T-junction of the multiplexer. As shown in FIG. 8, four signal divided stubs 103-106 are branched from the input port 101 via the respective connection line 102, 102'. The width and length of the connection line 102, 102' can be changed according to performance. The signal divided stub 103 has a length L1. The signal divided stub 104 has a length L2. The signal divided stub 105 has a length L3. The signal divided stub 106 has a length L4. The length L1, the length L2, the length L3, and the length L4 may be the same, or may be different from each other, depending on the layout of the four filters 2-5 on the PCB 1. Similarly, the four signal divided stubs 103-106 may have same or different width. The distance W1 between two signal divided stubs 103, 104 is approximately equal to the distance between the two resonators of the first and second filters 2, 3 that are coupled to each other by the T-junction. The distance W2 between two signal divided stubs 104, 105 is approximately equal to the distance between the two resonators of the second and third filters 3, 4 that are coupled to each other by the T-junction. The distance W3 between two signal divided stubs 105, 106 is approximately equal to the distance between the two resonators of the third and fourth filters 4, 5 that are coupled to each other by the T-junction. The distance W1, the distance W2 and the distance W3 may have the same value or different values, depending on full size requirement of the multiplexer.

Figure 9:
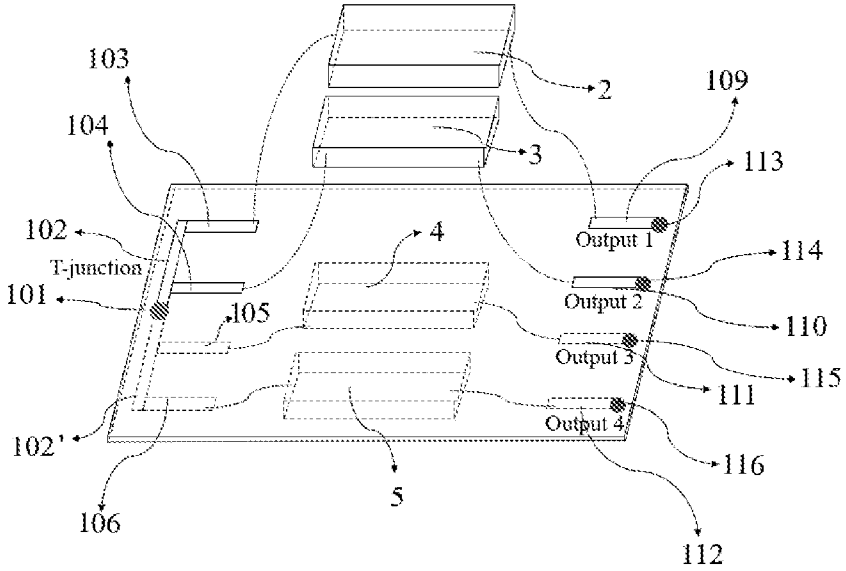
FIG. 9 is an exploded view illustrating a multiplexer according to another embodiment of the disclosure.

FIG. 9 is an exploded view illustrating a multiplexer according to another embodiment of the disclosure. The multiplexer according to this embodiment differs from the multiplexer shown in FIG. 7 only in that the four filters 2-5 are located at different sides of the PCB 1. That is, the first filter 2 and the second filter 3 are arranged at the top side of the PCB 1, while the third filter 4 and the fourth filter 5 are arranged at the bottom side of the PCB 1. In fact, all the four filters 2-5 can be located at any position of the PCB 1.

Figure 10:
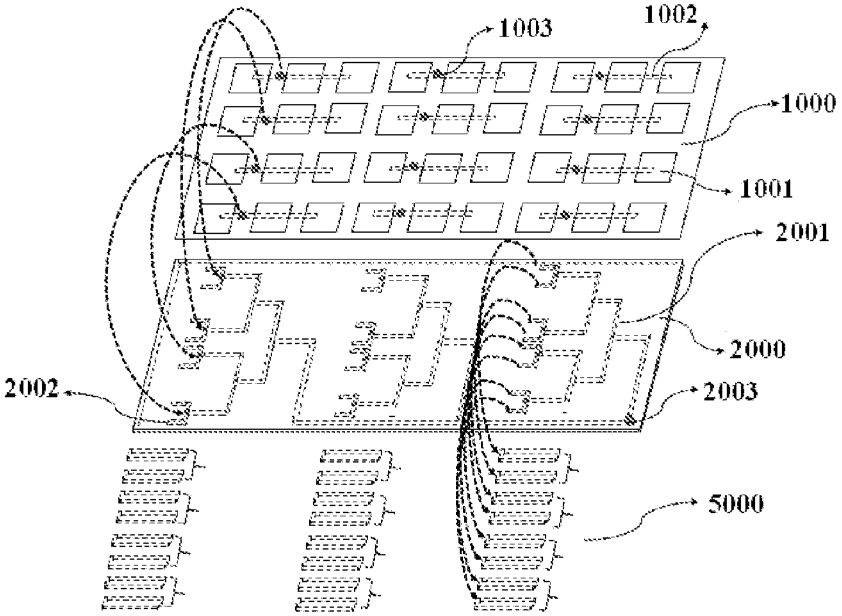
FIG. 10 is a schematic diagram illustrating an FU according to an embodiment of the disclosure.

FIG. 10 is a schematic diagram illustrating an AU according to an embodiment of the disclosure. The AU according to this embodiment includes an antenna board 1000, an AC board 2000, and a plurality of CWG filters 5000. The antenna board 1000 is provided with antenna elements 1001, power dividers 1002, and antenna input/output ports 1003. The AC board 2000 is provided with a calibration network 2001, a plurality of T-junctions 2002, and a power calibration output port 2003. In this embodiment, every two CWG filters 5000 forming a duplexer are combined with a corresponding T-junction 2002, which can transmit/receive a signal to/from a corresponding antenna input/out port 1003. The two CWG filters 5000 for one antenna channel are soldered to the bottom side of the AC board 2000. Every antenna channel divides a signal into two parts by the corresponding T-junction 2002. The AC board 2000 serves as the PCB 1 as described above. As the T-junctions 2002 are added to the AC board 2000 of the AU, no additional or dedicated PCB is needed. The AU will get smaller size, lighter weight and lower cost with this kind of duplexer. Further, the CWG filters 5000 of such a duplexer can be produced separately, which will make the production easier and improve products reliability.

In the embodiment shown in FIG. 10, the T-junctions 2002 are formed on the AC board 2000. However, the present disclosure is not limited to this. For example, the T-junctions may be formed on the antenna board 1000 instead of the AC board 2000. In another embodiment, the power dividers 1002 may be formed in a separate power divider board, and the T-junctions may be formed on the power divider board. It will be readily appreciated by those skilled in the art that the T-junctions may be formed on any board mounted/assembled together with antenna array.

Figure 11:
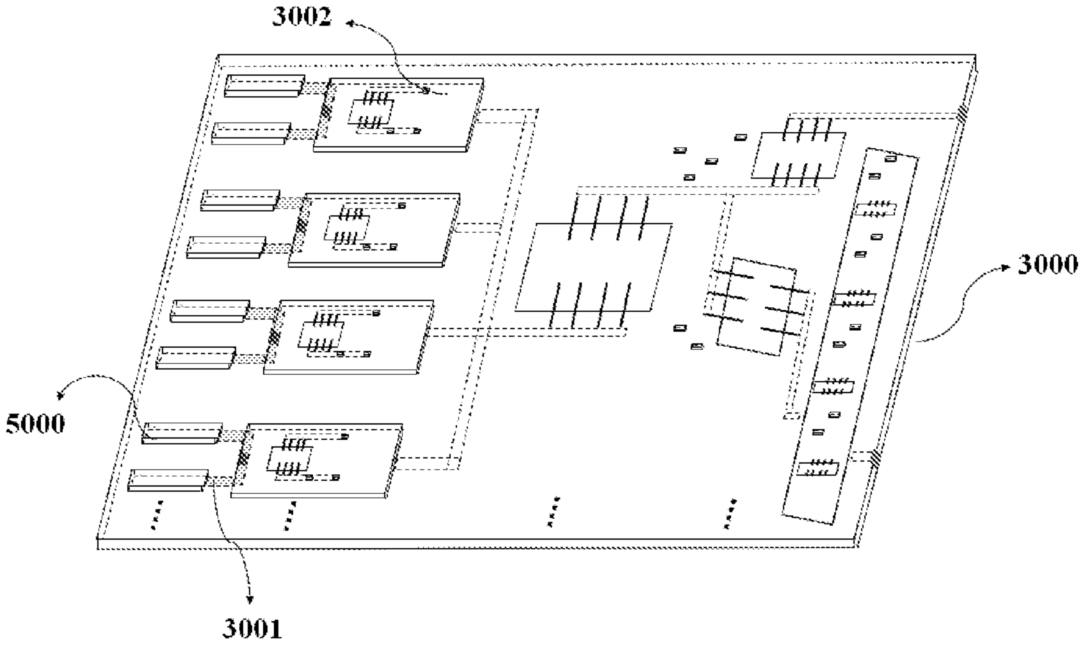
FIG. 11 is a schematic diagram illustrating an AU according to an embodiment of the disclosure.

FIG. 11 is a schematic diagram illustrating an RU according to an embodiment of the disclosure. The RU according to this embodiment includes a radio MOB 3000 and a plurality of CWG filters 5000. The CWG filters 5000 may be soldered to the top side and/or the bottom side of the radio MOB 3000. The radio MOB 3000 is further provided with a plurality of T-junctions 3001, a plurality of power amplifiers 3002, and other parts known to those skilled in the art. In this embodiment, every two CWG filters 5000 forming a duplexer are combined with a corresponding T-junction 3001, which can transmit a signal from a corresponding power amplifier 3002 to the CWG filters 5000. Each T-junction 3001 divides a corresponding signal channel into two parts. The radio MOB 3000 serves as the PCB 1 as described above. As the T-junctions 3001 are added to the radio MOB 3000, no additional or dedicated PCB is needed. The RU will get smaller size, lighter weight and lower cost with this kind of duplexer. Further, the CWG filters 5000 of such a duplexer can be produced separately, which will make the production easier and improve products reliability.

In the above-mentioned embodiments of AU or RU, an LPF may be mounted on the AC board 2000 or the radio MOB 3000. By combining the T-junctions 2002 or 3001 with strip line LPF, the out-of-band attenuation performance can be improved.

The present disclosure also relates to a BS comprising the above mentioned AU and/or RU, especially a FDD system or a dual band system.

Advantages of embodiments of the disclosure will be described below.

Existing CWG multiplexer normally uses a ceramic T-junction to divide one signal to different paths. This kind of T-junction will increase the size and weight of the ceramic part and will also increase design difficulty. Different multiplexer paths can't be located at flexible positions, and more crosstalk may occur between different multiplexer paths.

According to embodiments of the present disclosure, a first CWG filter is coupled to a second CWG or other kinds of filter through a T-junction formed on a PCB. Preferably, the T-junction may be a microstip line or a strip line on the PCB. Accordingly, the size, weight and volume of the product is significantly reduced, the filters can be easily located at desired position, without increasing the design and production limitation. The T-junction makes it easy to integrate various kinds of filter technology with CWG filter to balance the requirement.

Further, according to embodiments of the present disclosure, the T-junction is formed on the AC board of the AU or the MOB board of the RU. Accordingly, it can increase the integration of radio devices and reduce the number of RF connectors. Moreover, the PCB on which the T-junction is provided can also be combined with strip line LPF, and no additional PCB for LPF is needed. If the filter from each channel need addition of some capacity cross coupling, the kind of strip line coupling also could be combined with the PCB on which the T-junction is provided. The design will be so flexible and high degree of integration will bring greater cost reduction.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. An antenna unit comprising:

an antenna board comprising a plurality of antenna elements and one or more antenna ports coupled to the plurality of antenna elements; and a plurality of filters having a respective plurality of radio frequency passbands, wherein:

a first one of the plurality of filters is a ceramic waveguide (CWG) filter, the first filter is coupled to a second one of the plurality of filters through a T-junction formed on one of the following boards: the antenna board, or another board comprising the antenna unit, and the T-junction is also coupled to one of the one or more antenna ports.

2. The antenna unit according to claim 1, wherein the T-junction is a microstrip line or a strip line.

3. The antenna unit according to claim 1, wherein the T-junction is connected to at least one of the first filter and the second filter via a soldering pad or a connector.

4. The antenna unit according to claim 1, wherein:

the first filter includes a plurality of resonators; and the board on which the T-junction is formed includes a coupling structure that provides capacitive cross coupling between two of the resonators.

5. The antenna unit according to claim 1, wherein the second filter is a CWG filter, a metal cavity filter, a surface acoustic wave (SAW) filter, a bulk acoustic wave (BAW) filter, or a film bulk acoustic resonator (FBAR) filter.

6. The antenna unit according to claim 1, wherein the first filter and the second filter are arranged on the same side or different sides of the board on which the T-junction is formed.

7. The antenna unit according to claim 1, further comprising a low pass filter mounted on the board on which the T-junction is formed.

8. The antenna unit according to claim 1, wherein the T-junction is formed on the other board comprising the antenna unit, wherein the other board is one of the following: an antenna calibration (AC) board, or a power divider board.

9. A base station comprising the antenna unit of claim 1.

10. The base station according to claim 9, wherein the base station is a frequency division duplex (FDD) system or a dual band system.

11. A radio unit comprising:

a radio mother board (MOB) including a power amplifier; and a plurality of filters having a respective plurality of radio frequency passbands, wherein:

a first one of the plurality of filters is a ceramic waveguide (CWG) filter, the first filter is coupled to a second one of the plurality of filters through a T-junction formed on the radio MOB, and the T-junction is also coupled to the power amplifier, wherein the T-junction is a microstrip line or a strip line.

12. The radio unit according to claim 11, wherein the T-junction is connected to at least one of the first filter and the second filter via a soldering pad or a connector.

13. The radio unit according to claim 11, wherein:

the first filter includes a plurality of resonators; and the radio MOB includes a coupling structure that provides capacitive cross coupling between two of the resonators.

14. The radio unit according to claim 11, wherein the second filter is one of the following: a CWG filter, a metal cavity filter, a surface acoustic wave (SAW) filter, a bulk acoustic wave (BAW) filter, or a film bulk acoustic resonator (FBAR) filter.

15. The radio unit according to claim 11, wherein the first filter and the second filter are arranged on the same side of the radio MOB or on different sides of the radio MOB.

16. The radio unit according to claim 11, further comprising a low pass filter mounted on the radio MOB.

* * * * *